(12) United States Patent
Hosoi et al.

(10) Patent No.: US 11,652,222 B2
(45) Date of Patent: May 16, 2023

(54) FUEL CELL SYSTEM

(71) Applicant: TOYOTA JIDOSHA KABUSHIKI KAISHA, Toyota (JP)

(72) Inventors: Takami Hosoi, Aichi-gun (JP); Hiroaki Nishiumi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 17/443,490

(22) Filed: Jul. 27, 2021

(65) Prior Publication Data

US 2022/0093947 A1  Mar. 24, 2022

(30) Foreign Application Priority Data

Sep. 23, 2020  (JP) .............................. JP2020-158164

(51) Int. Cl.
*H01M 8/04119* (2016.01)
*H01M 8/04082* (2016.01)
*B60L 50/71* (2019.01)
*H01M 8/04858* (2016.01)

(52) U.S. Cl.
CPC ......... *H01M 8/04164* (2013.01); *B60L 50/71* (2019.02); *H01M 8/04201* (2013.01); *H01M 8/04925* (2013.01); *H01M 2250/20* (2013.01)

(58) Field of Classification Search
CPC ...... H01M 2250/20; B60L 50/71; B60L 50/72
See application file for complete search history.

(56) References Cited

U.S. PATENT DOCUMENTS

2018/0123148 A1  5/2018  Itoga

FOREIGN PATENT DOCUMENTS

JP      2018073564 A    5/2018

*Primary Examiner* — Adam A Arciero
(74) *Attorney, Agent, or Firm* — Hunton Andrews Kurth LLP

(57) ABSTRACT

A fuel cell system includes a fuel cell stack having a hydrogen hole in which hydrogen gas passes, a hydrogen-related auxiliary machine, and a hydrogen pipe that connects the hydrogen hole and the hydrogen-related auxiliary machine. The hydrogen pipe includes a liquid retention part that is located below the hydrogen hole, and a connecting point between the hydrogen pipe and the hydrogen-related auxiliary machine in a gravity direction.

5 Claims, 3 Drawing Sheets

FUEL CELL SYSTEM

CROSS-REFERENCE TO RELATED APPLICATION

This application claims priority to Japanese Patent Application No. 2020-158164 filed on Sep. 23, 2020, incorporated herein by reference in its entirety.

BACKGROUND

1. Technical Field

The disclosure relates to a fuel cell system.

2. Description of Related Art

In Japanese Unexamined Patent Application Publication No. 2018-073564 (JP 2018-073564 A), a fuel cell system including hydrogen-related auxiliary machines such as a hydrogen circulation pump and a gas-liquid separator is described. In the fuel cell system, a gas-liquid separator is provided in a lowermost part of a hydrogen gas circulation flow passage so that moisture discharged from a hydrogen gas outlet of a fuel cell stack flows down into the gas-liquid separator and does not stay in the hydrogen gas circulation flow passage.

SUMMARY

However, in the related art described above, there is a problem that, since the liquid water stays in the gas-liquid separator, the liquid water is frozen inside the gas-liquid separator. The same kind of problems also happen in other hydrogen-related auxiliary machines other than the gas-liquid separator.

This disclosure may be realized in aspects described below.

(1) According to an aspect of the disclosure, a fuel cell system is provided. The fuel cell system includes a fuel cell stack having a hydrogen hole in which hydrogen gas passes, a hydrogen-related auxiliary machine, and a hydrogen pipe that connects the hydrogen hole and the hydrogen-related auxiliary machine. The hydrogen pipe includes a liquid retention part that is located below the hydrogen hole and a connecting point between the hydrogen pipe and the hydrogen-related auxiliary machine in a gravity direction.

With the fuel cell system, liquid water discharged from the hydrogen hole is retained in the liquid retention part. Therefore, it is possible to restrain the liquid water from entering the hydrogen-related auxiliary machine and freezing inside the hydrogen-related auxiliary machine.

(2) In the fuel cell system described above, the hydrogen hole may be located below the connecting point between the hydrogen pipe and the hydrogen-related auxiliary machine.

With the structure of the fuel cell system, liquid water is easily prevented from flowing into the hydrogen-related auxiliary machine.

(3) In the fuel cell system described above, the hydrogen hole may include a hydrogen outlet hole that is an outlet of hydrogen off-gas from the fuel cell stack, the hydrogen-related auxiliary machine may include a gas-liquid separator configured to separate moisture from the hydrogen off-gas, and the hydrogen pipe may include a pipe that connects the hydrogen outlet hole and the gas-liquid separator.

With the structure of the fuel cell system, it is unlikely that liquid water enters the gas-liquid separator.

(4) In the fuel cell system described above, the hydrogen hole may include a hydrogen inlet hole that is an inlet of hydrogen gas into the fuel cell stack, the hydrogen-related auxiliary machine may include a hydrogen circulation pump configured to feed hydrogen off-gas towards the hydrogen inlet hole, and the hydrogen pipe may include a pipe that connects the hydrogen inlet hole and the hydrogen circulation pump.

With the structure of the fuel cell system, it is unlikely that liquid water enters the hydrogen circulation pump.

(5) The fuel cell system described above may include a power converter arranged on top of the fuel cell stack. Also, the hydrogen hole may include a hydrogen outlet hole that is an outlet of hydrogen off-gas from the fuel cell stack, and a hydrogen inlet hole that is an inlet of hydrogen gas into the fuel cell stack. The hydrogen-related auxiliary machine may include a gas-liquid separator configured to separate moisture from the hydrogen off-gas, and a hydrogen circulation pump configured to feed the hydrogen off-gas to the hydrogen inlet hole, and the hydrogen pipe may include a first hydrogen pipe that connects the hydrogen outlet hole and the gas-liquid separator, and a second hydrogen pipe that connects the hydrogen inlet hole and the hydrogen circulation pump. Further, the hydrogen circulation pump may be arranged above the gas-liquid separator, and the hydrogen circulation pump may be arranged so that at least a part of a projected area of the hydrogen circulation pump overlaps the power converter when the hydrogen circulation pump is projected towards the power converter along a horizontal direction.

With the fuel cell system, it is possible to restrain liquid water from entering the gas-liquid separator and the hydrogen circulation pump, and freezing inside the hydrogen-related auxiliary machine. Also, it is possible to reduce the height of the entire fuel cell system.

(6) In the fuel cell system described above, the hydrogen pipe may be structured to monotonously descend from the hydrogen hole through the liquid retention part without ascending.

With the fuel cell system, liquid water discharged from the hydrogen hole is reliably retained in the liquid retention part.

(7) In the fuel cell system described above, the liquid retention part may be a bent part that is bent to protrude downwardly.

With the fuel cell system, the liquid retention part is formed easily by a bent part.

(8) In the fuel cell system described above, the liquid retention part may be a depressed part that is depressed downwardly inside the hydrogen pipe.

With the fuel cell system, the liquid retention part is formed easily by the depressed part.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
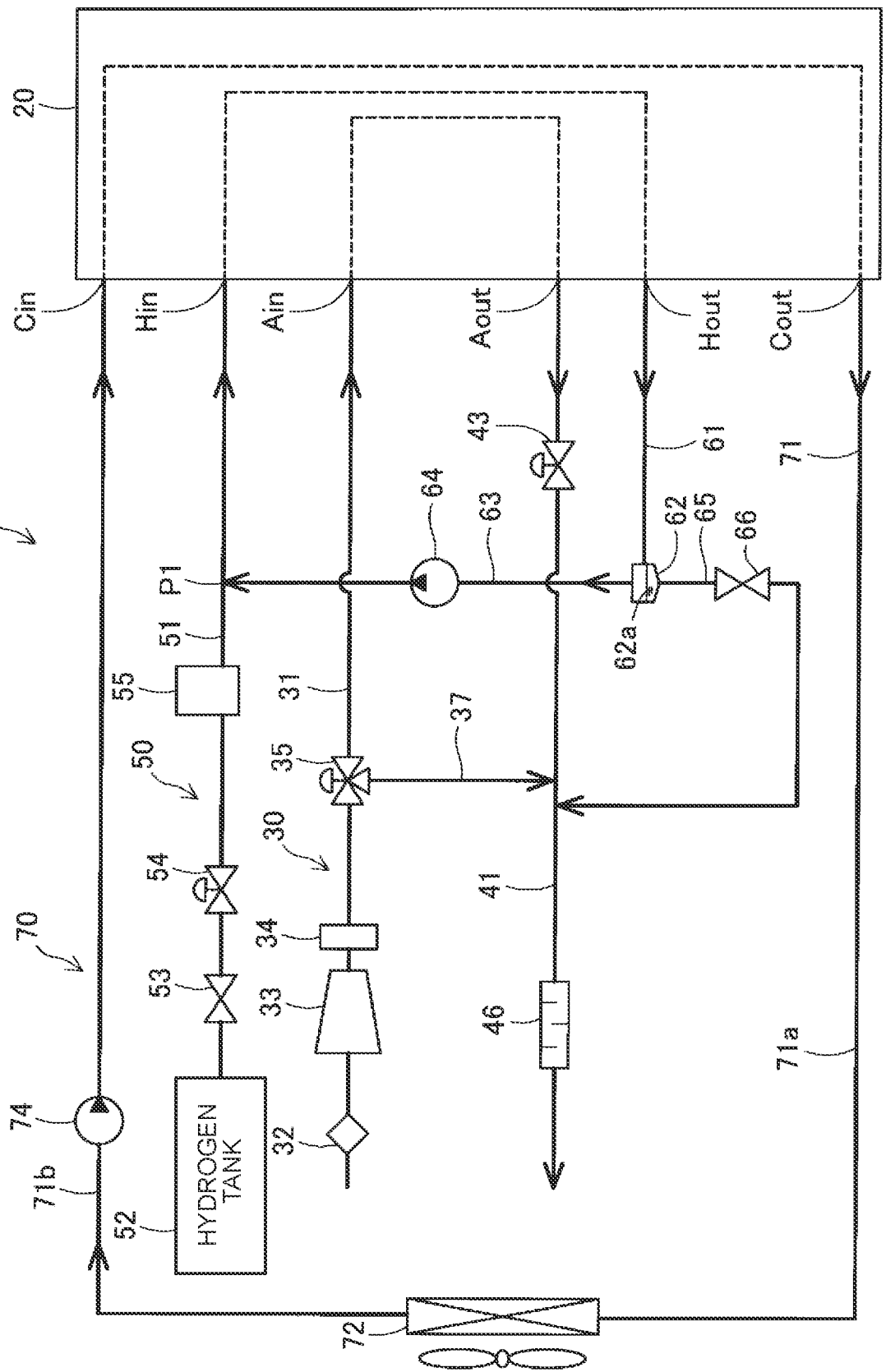
FIG. 1 is a view describing a flow passage configuration of a fuel cell system according to an embodiment.

FIG. 1 is a view describing a flow passage configuration of a fuel cell system 10 according to an embodiment of the disclosure. The fuel cell system 10 is mounted on a mobile body and outputs electric power as per a request from a driver, the electric power being used as driving force. The mobile body is, for example, a vehicle such as a four-wheel vehicle. However, the fuel cell system 10 may be stationary. The fuel cell system 10 includes a fuel cell stack 20, an air feed-discharge part 30, a hydrogen gas feed-discharge part 50, and a coolant circulation part 70.

The fuel cell stack 20 is a unit that generates electricity due to electrochemical reaction between fuel gas and oxidant gas, and the fuel cell stack 20 is formed as a plurality of single fuel cells is layered on each other. Although many different types of fuel cell stacks 20 may be applied, a solid-polymer type fuel cell stack is used in this embodiment. The fuel gas is hydrogen gas, and oxidant gas is air. Each of the single fuel cells includes a membrane electrode assembly and separators. The membrane electrode assembly is an electric generation element in which a cathode electrode and an anode electrode are arranged on both sides of an electrolyte membrane, respectively. The separators are arranged on both sides of the membrane electrode assembly, respectively. The electrolyte membrane is made of a solid polymer membrane having good proton conductivity in a wet state where moisture is contained inside.

The air feed-discharge part 30 includes a function of feeding air as oxidant gas to the fuel cell stack 20, and a function of discharging, to an outside of the fuel cell system 10, wastewater and cathode off-gas discharged from a cathode side of the fuel cell stack 20. The air feed-discharge part 30 includes an air feed pipe 31, an air cleaner 32, an air compressor 33, an intercooler 34, a flow dividing valve 35, and an airflow dividing pipe 37 on an upstream side with respect to the fuel cell stack 20. The intercooler 34 reduces intake air temperature that increases due to supercharging. The air feed pipe 31 is a pipe that is connected with an air inlet hole Ain of the fuel cell stack 20. The air cleaner 32, the air compressor 33, the intercooler 34, and the flow dividing valve 35 are provided in this order in the air feed pipe 31 from the intake port side toward a downstream side. On the intake port side, outside air is taken. The air cleaner 32 is provided in the air feed pipe 31 on the intake port side and cleans air that is taken. The air compressor 33 takes in air and feeds compressed air into the air inlet hole Ain of the fuel cell stack 20. The intercooler 34 decreases intake air temperature that increases due to the air compressor 33.

The flow dividing valve 35 is provided between the intercooler 34 and the fuel cell stack 20, and divides a flow of air that is compressed by the air compressor 33 and cooled by the intercooler 34 into the fuel cell stack 20 side and the cathode off-gas pipe 41 side through the airflow dividing pipe 37. In the air feed-discharge part 30, the cathode off-gas pipe 41, the pressure regulating valve 43, and the muffler 46 are provided on the downstream side with respect to the fuel cell stack 20. The cathode off-gas pipe 41 is a pipe that is connected with an air outlet hole Aout of the fuel cell stack 20, and is able to discharge cathode off-gas containing produced water outside the fuel cell system 10. The pressure regulating valve 43 is provided in the cathode off-gas pipe 41 and regulates pressure of the cathode off-gas that is back pressure on the cathode side of the fuel cell stack 20. A port of the airflow dividing pipe 37 for the divided flow is connected with a portion of the cathode off-gas pipe 41 between the pressure regulating valve 43 and the muffler 46.

The hydrogen gas feed-discharge part 50 has a function of feeding hydrogen gas to the fuel cell stack 20, a function of discharging hydrogen off-gas to the outside of the fuel cell system 10, the hydrogen off-gas being discharged from the fuel cell stack 20, and a function of circulating hydrogen gas inside the fuel cell system 10. The hydrogen gas feed-discharge part 50 includes a hydrogen gas feed pipe 51 and a hydrogen tank 52 on the upstream side with respect to the fuel cell stack 20. The hydrogen tank 52 is filled with high-pressure hydrogen to be fed into the fuel cell stack 20. The hydrogen tank 52 is connected with a hydrogen inlet hole Hin of the fuel cell stack 20 through the hydrogen gas feed pipe 51. Further provided in the hydrogen gas feed pipe 51 are an opening and closing valve 53, a regulator 54, and a hydrogen feeder 55 in this order from the upstream side. The opening and closing valve 53 regulates an inflow of hydrogen from the hydrogen tank 52 into the hydrogen feeder 55. The regulator 54 is a pressure-reducing valve that regulates pressure of hydrogen on the upstream side of the hydrogen feeder 55. The hydrogen feeder 55 is made of an injector that is an electromagnetic opening and closing valve, for example.

The hydrogen gas feed-discharge part 50 includes a hydrogen off-gas pipe 61, a gas-liquid separator 62, a hydrogen gas circulation pipe 63, a hydrogen circulation pump 64, a drain pipe 65, and a drain valve 66 that are provided on the downstream side with respect to the fuel cell stack 20. The hydrogen off-gas pipe 61 is a hydrogen pipe that directly connects a hydrogen outlet hole Hout of the fuel cell stack 20 and the gas-liquid separator 62.

The gas-liquid separator 62 is connected with the hydrogen gas circulation pipe 63 and the drain pipe 65. Anode off-gas that flows into the gas-liquid separator 62 through the hydrogen off-gas pipe 61 is separated into gas component and moisture by the gas-liquid separator 62. The anode off-gas is also referred to as "hydrogen off-gas". Inside the gas-liquid separator 62, gas component of the hydrogen off-gas is led to the hydrogen gas circulation pipe 63. Moisture separated by the gas-liquid separator 62 is stored in a water storage part 62a temporarily, and then led to the drain pipe 65 from the water storage part 62a.

The hydrogen gas circulation pipe 63 is connected with a junction P1 located on the downstream side of the hydrogen feeder 55 in the hydrogen gas feed pipe 51. The hydrogen circulation pump 64 is provided in the hydrogen gas circulation pipe 63. The hydrogen circulation pump 64 functions as a circulation pump that pumps out hydrogen gas to the hydrogen gas feed pipe 51, the hydrogen gas being contained in gas component that is separated by the gas-liquid separator 62. The hydrogen off-gas pipe 61 and the hydrogen gas circulation pipe 63 structure a hydrogen gas circulation flow passage.

The drain valve 66 is provided in the drain pipe 65. The drain valve 66 is normally closed, and is open at given drain timing that is previously set, and at discharge timing of inert gas contained in hydrogen off-gas. A downstream end of the drain pipe 65 is joined to the cathode off-gas pipe 41 so that wastewater and hydrogen off-gas on the anode-side may be mixed with wastewater and air off-gas on the cathode-side and discharged. A portion of the drain pipe 65 that connects the gas-liquid separator 62 and the drain valve 66 may be omitted.

The coolant circulation part 70 includes a coolant pipe 71, a radiator 72, and a coolant circulation pump 74. The coolant pipe 71 is a pipe where coolant is circulated in order to cool the fuel cell stack 20, and includes an upstream-side pipe 71a and a downstream-side pipe 71b. The upstream-side pipe 71a connects a coolant outlet hole Cout of a coolant flow passage inside the fuel cell stack 20, and an inlet of the radiator 72. The downstream-side pipe 71b connects a coolant inlet hole Cin of the coolant flow passage inside the fuel cell stack 20, and an outlet of the radiator 72. The radiator 72 has a fun that takes in outside air, and exchanges heat between the coolant in the coolant pipe 71 and outside air so as to cool the coolant. The coolant circulation pump 74 is provided in the downstream-side pipe 71b. The coolant flows inside the coolant pipe 71 due to driving force of the coolant circulation pump 74.

Components of the air feed-discharge part 30, the hydrogen gas feed-discharge part 50, and the coolant circulation part 70 are controlled by a control part (not shown) that is constituted by a microcomputer. As a result, hydrogen gas and air fed to the fuel cell stack 20, drainage from the fuel cell stack 20, and cooling of waste heat generated in the fuel cell stack 20 are controlled.

When the fuel cell stack 20 is mounted on a vehicle, the fuel cell stack 20 and the hydrogen-related auxiliary machines including the gas-liquid separator 62 and the hydrogen circulation pump 64 are installed inside a front compartment of the vehicle.

Figure 2:
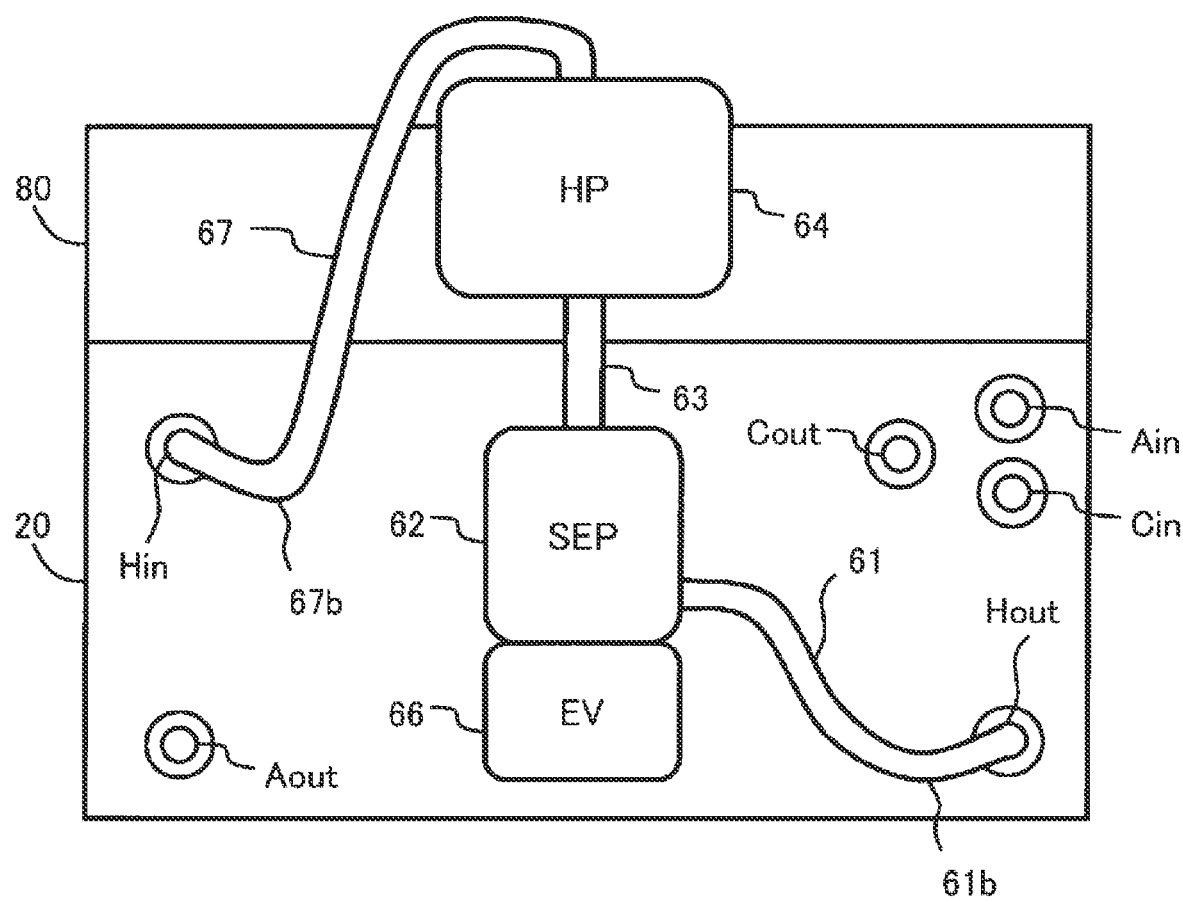
FIG. 2 is a view describing arrangement of a hydrogen-related auxiliary machine and a hydrogen pipe according to a first embodiment.
Figure 2:
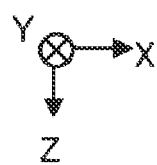

FIG. 2 is a view describing arrangement of the hydrogen-related auxiliary machines and the hydrogen pipe according to the first embodiment. In FIG. 2, an X axis and a Y axis represent the horizontal direction, and a Z axis represents the gravity direction. FIG. 2 corresponds to a front view of an end surface of the fuel cell stack 20 seen in the horizontal direction. When the fuel cell stack 20 is mounted on the mobile body, the state shown in FIG. 2 represents a state where the mobile body is stopped on a horizontal place.

A power converter 80 is placed on top of the fuel cell stack 20. The power converter 80 includes a plurality of power semiconductors that constructs an FC converter, a pump inverter, and so on. The FC converter changes output voltage of the fuel cell stack 20, and the pump inverter performs power exchange for the hydrogen circulation pump 64. The power converter 80 is placed on top of the fuel cell stack 20 because the coolant used for cooling the fuel cell stack 20 is also used to cool the power converter 80. In the example shown in FIG. 2, the power converter 80 is installed so as to be in contact with a top surface of the fuel cell stack 20. However, a member may be inserted between the power converter 80 and the fuel cell stack 20.

In the end surface of the fuel cell stack 20, the hydrogen inlet hole Hin, the hydrogen outlet hole Hout, the air inlet hole Ain, the air outlet hole Aout, the coolant inlet hole Cin, and the coolant outlet hole Cout are provided. In the example shown in FIG. 2, the hydrogen inlet hole Hin is arranged adjacent to an upper-left end of the fuel cell stack 20, and the hydrogen outlet hole Hout is arranged adjacent to a lower-right end of the fuel cell stack 20 diagonal to the hydrogen inlet hole Hin. Further, the air inlet hole Ain, the coolant inlet hole Cin, and the coolant outlet hole Cout are arranged adjacent to an upper-right end of the fuel cell stack 20, and the air outlet hole Aout is arranged adjacent to a lower-left end of the fuel cell stack 20. The hydrogen inlet hole Hin and the hydrogen outlet hole Hout correspond to "hydrogen holes" in this disclosure.

In FIG. 2, the hydrogen circulation pump 64, the gas-liquid separator 62, and the drain valve 66 are described as the hydrogen-related auxiliary machines. In this embodiment, the hydrogen circulation pump 64 is directly connected with the hydrogen inlet hole Hin by the connecting pipe 67. Also, the gas-liquid separator 62 is directly connected with the hydrogen outlet hole Hout by the hydrogen off-gas pipe 61. A lower end of the gas-liquid separator 62 is directly connected with the drain valve 66. In this disclosure, the "direct connection" means that there are no auxiliary machines such as a valve in-between.

The hydrogen off-gas pipe 61 that connects the gas-liquid separator 62 and the hydrogen outlet hole Hout includes a liquid retention part 61b. The liquid retention part 61b is arranged below the hydrogen outlet hole Hout, and a connecting point between the hydrogen off-gas pipe 61 and the gas-liquid separator 62 in the gravity direction. In the example shown in FIG. 2, the liquid retention part 61b is formed as a bent part that is bent to protrude downwardly. In other words, the liquid retention part 61b is a bent pipe that is bent to protrude downwardly. The bent part including the liquid retention part 61b may be made as an U-shaped pipe. In a case where liquid water is discharged from the hydrogen outlet hole Hout when, for example, the fuel cell system 10 is stopped, the liquid retention part 61b is able to retain the liquid water. As a result, it is possible restrain the liquid water from entering the gas-liquid separator 62 and freezing inside the gas-liquid separator 62. Further, in the example in FIG. 2, since the hydrogen outlet hole Hout is located below the connecting point between the hydrogen off-gas pipe 61 and the gas-liquid separator 62, liquid water is easily prevented from flowing into the gas-liquid separator 62. Further, the hydrogen off-gas pipe 61 is made so that it descends monotonously from the hydrogen outlet hole Hout through the liquid retention part 61b without ascending. As a result, liquid water discharged from the hydrogen outlet hole Hout is retained reliably in the liquid retention part 61b. The expression "monotonous descend" includes a structure in which both a horizontal part and a descending part exist, and a structure in which only the descending part exists between the hydrogen outlet hole Hout and the liquid retention part 61b. The hydrogen off-gas pipe 61 does not need to monotonously descend from the hydrogen outlet hole Hout through the liquid retention part 61b, and may include a part that ascends between the hydrogen outlet hole Hout and the liquid retention part 61b. It is preferred that the hydrogen off-gas pipe 61 descends continuously from the hydrogen outlet hole Hout through the liquid retention part 61b.

The connecting pipe 67 that connects the hydrogen circulation pump 64 and the hydrogen inlet hole Hin corresponds to a pipe between the hydrogen circulation pump 64 and the hydrogen inlet hole Hin shown in FIG. 1. In the configuration shown in FIG. 1, after the hydrogen gas circulation pipe 63 and the hydrogen gas feed pipe 51 are joined at the junction P1, the hydrogen gas feed pipe 51 is connected with the hydrogen inlet hole Hin. In FIG. 2, the configuration that connects the hydrogen inlet hole Hin and the hydrogen circulation pump 64 is illustrated in a simplified manner.

The connecting pipe 67 that connects the hydrogen circulation pump 64 and the hydrogen inlet hole Hin has similar characteristics to those of the hydrogen off-gas pipe 61. The connecting pipe 67 includes a liquid retention part 67b arranged below the hydrogen inlet hole Hin and a connecting point between the connecting pipe 67 and the hydrogen circulation pump 64 in the gravity direction. In the example shown in FIG. 2, the liquid retention part 67b is formed as a bent part that is bent to protrude downwardly.

The bent part including the liquid retention part 67b may be configured as an U-shaped pipe. In a case where liquid water is discharged from the hydrogen inlet hole Hin when, for example, the fuel cell system 10 is stopped, the liquid retention part 67b is able to retain the liquid water. As a result, it is possible to restrain the liquid water from entering the hydrogen circulation pump 64 and freezing inside the hydrogen circulation pump 64. Further, since the hydrogen inlet hole Hin is located below the connecting point between the connecting pipe 67 and the hydrogen circulation pump 64, it is possible to easily prevent liquid water from flowing into the hydrogen circulation pump 64 with this structure. Further, the connecting pipe 67 is structured to monotonously descend from the hydrogen inlet hole Hin through the liquid retention part 67b without ascending. As a result, liquid water discharged from the hydrogen inlet hole Hin is reliably retained in the liquid retention part 67b. However, the connecting pipe 67 does not need to descend monotonously from the hydrogen inlet hole Hin through the liquid retention part 67b, and may be configured to include a portion that ascends between the hydrogen inlet hole Hin and the liquid retention part 67b. It is preferred that the connecting pipe 67 descends continuously from the hydrogen inlet hole Hin through the liquid retention part 67b.

In the example shown in FIG. 2, although the hydrogen off-gas pipe 61 and the connecting pipe 67 include the liquid retention parts 61b, 67b, respectively, one of the liquid retention parts 61b, 67b may be omitted. However, it is preferred that both of the liquid retention parts 61b, 67b are provided in terms of reducing the possibility of liquid water entering or freezing in the gas-liquid separator 62 and the hydrogen circulation pump 64. In other embodiments, when a hydrogen-related auxiliary machine other than the gas-liquid separator 62 and the hydrogen circulation pump 64 is connected directly with a hydrogen hole through a hydrogen pipe, it is preferred that the liquid retention part is provided in the hydrogen pipe.

Further, in the example shown in FIG. 2, the hydrogen circulation pump 64 is arranged above the gas-liquid separator 62. Further, the hydrogen circulation pump 64 is arranged so that, when the hydrogen circulation pump 64 is projected towards the power converter 80 along the horizontal direction, a part of the projected area of the hydrogen circulation pump 64 overlaps the power converter 80. As a result, it is possible to reduce the height of the entire fuel cell system 10. The hydrogen circulation pump 64 may be arranged so that the entire projected area of the hydrogen circulation pump 64 overlaps the power converter 80. In the example shown in FIG. 2, the gas-liquid separator 62 is arranged so that, when the gas-liquid separator 62 is projected towards the fuel cell stack 20 in the horizontal direction, the entire projected area of the gas-liquid separator 62 overlaps the fuel cell stack 20. Thus, it is possible to further reduce the height of the entire fuel cell system 10.

It is preferred that inner diameters of the hydrogen off-gas pipe 61 and the connecting pipe 67 are set so that liquid water inside the liquid retention parts 61b, 67b is blown away with a flow rate of hydrogen gas during idle driving of the fuel cell system 10. "Idle driving" means a driving state of the fuel cell system 10 in a situation where the vehicle is stopped and an accelerator pedal is not depressed. As long as liquid water inside the liquid retention parts 61b, 67b is blown away with the flow rate of hydrogen gas during the idle driving, it is possible to prevent liquid water from staying inside the hydrogen pipe during idle driving. As a result, in a case where hydrogen gas flows at a high flow rate while a vehicle is running, it is possible to reduce the possibility that a defect happens where a large amount of liquid water flows into the fuel cell stack 20 and negative potential is generated in the single fuel cell.

Further, it is preferred that the hydrogen off-gas pipe 61 is configured so that a flow passage sectional area of the liquid retention part 61b is smaller than a flow passage sectional area of each of portions of the hydrogen off-gas pipe 61 sandwiching the liquid retention part 61b. This brings advantages that flow speed of hydrogen gas increases in the liquid retention part 61b, and liquid water stored in the liquid retention part 61b is thus easily removed. Similarly, it is preferred that the connecting pipe 67 is configured so that a flow passage sectional area of the liquid retention part 67b is smaller than a flow passage sectional area of each of portions of the connecting pipe 67 sandwiching the liquid retention part 67b.

It is preferred that the fuel cell system 10 executes scavenging on the anode side of the fuel cell stack 20 when an operation of the fuel cell system 10 is stopped. With the scavenging, it is possible to blow away liquid water stored in the liquid retention parts 61b, 67b. Further, it is preferred to perform warming-up when the fuel cell system 10 starts at cold time. An amount of liquid water stored in the liquid retention parts 61b, 67b is about 1cc. Therefore, even when the liquid water is frozen, it is possible to melt the liquid water due to the warming-up.

As described above, in the first embodiment, since the hydrogen off-gas pipe 61 that is the hydrogen pipe has the liquid retention part 61b, liquid water discharged from the hydrogen outlet hole Hout is restrained from entering the gas-liquid separator 62 and freezing in the gas-liquid separator 62. Similarly, since the connecting pipe 67 that is another hydrogen pipe has the liquid retention part 67b, liquid water discharged from the hydrogen inlet hole Hin is restrained from entering the hydrogen circulation pump 64 that is the hydrogen-related auxiliary machine and freezing inside the hydrogen circulation pump 64.

Figure 3:
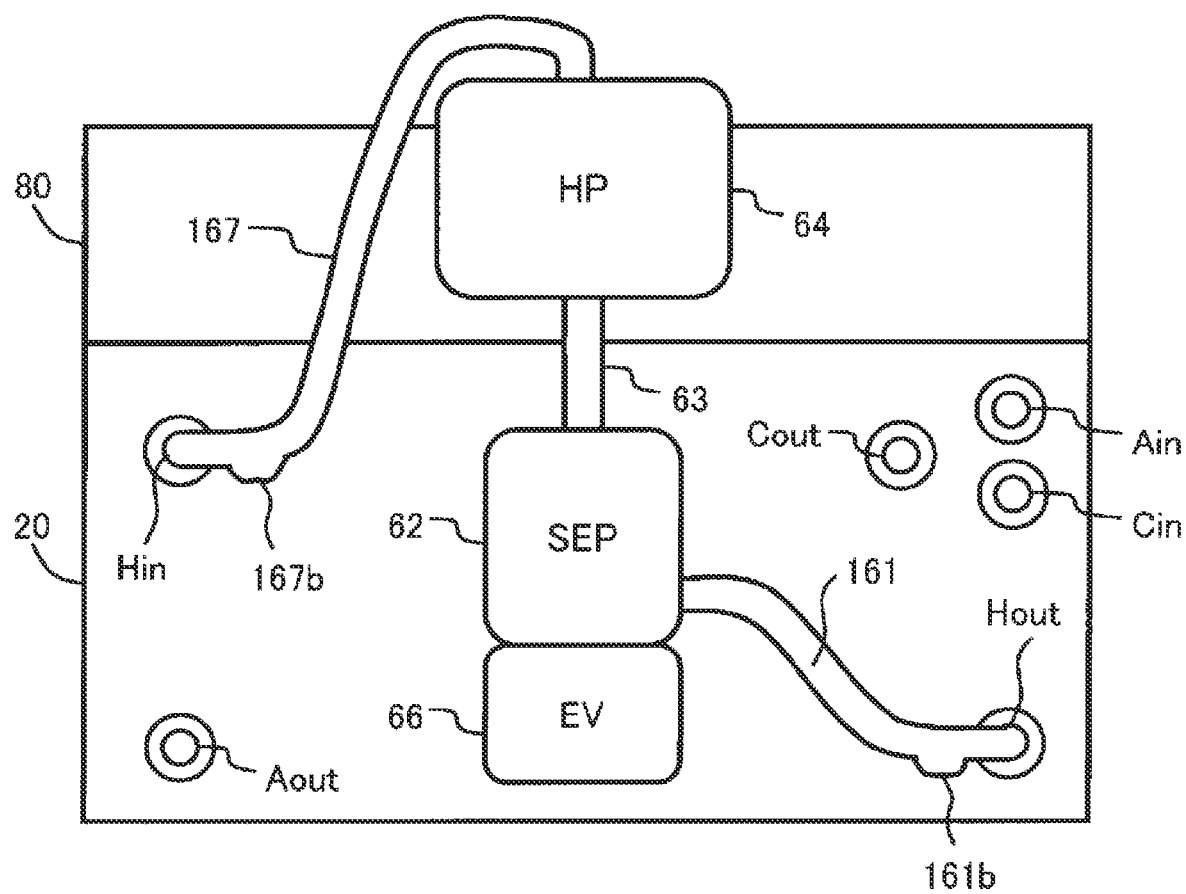
FIG. 3 is a view describing arrangement of a hydrogen-related auxiliary machine and a hydrogen pipe according to a second embodiment.
Figure 3:
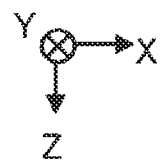

FIG. 3 is a view describing arrangement of a hydrogen-related auxiliary machine and a hydrogen pipe according to a second embodiment. A difference from the first embodiment is that the configurations of a hydrogen off-gas pipe 161 and a connecting pipe 167 that are hydrogen pipes are different from those in FIG. 2, and the rest of the components are the same as those in the first embodiment.

The hydrogen off-gas pipe 161 has a liquid retention part 161b. The liquid retention part 161b is common to the liquid retention part 61b shown in FIG. 2 in that the liquid retention part 161b is arranged below the hydrogen outlet hole Hout, and a connecting point between the hydrogen off-gas pipe 161 and the gas-liquid separator 62 in the gravity direction. However, the liquid retention part 161b shown in FIG. 3 is formed as a downwardly depressed portion inside the hydrogen off-gas pipe 161. In other words, the liquid retention part 161b is a portion where the bottom surface of the inside of the hydrogen off-gas pipe 161 is formed into a depressed shape. The liquid retention part 161b is also able to retain liquid water discharged from the hydrogen outlet hole Hout. Further, in the second embodiment, the hydrogen off-gas pipe 161 is common to the hydrogen off-gas pipe 61 shown in FIG. 2 in that the hydrogen off-gas pipe 161 is structured to monotonously descend from the hydrogen outlet hole Hout through the liquid retention part 161b without ascending. In the second embodiment, it is also preferred that the hydrogen off-gas pipe 161 is configured so that a flow passage sectional area of the liquid retention part 161b is smaller than a flow passage sectional area of each of portions of the hydrogen off-gas pipe 161 sandwiching the liquid retention part 161b.

The connecting pipe 167 also includes a liquid retention part 167b. The liquid retention part 167b is in common to the liquid retention part 67b shown in FIG. 2 in that the liquid retention part 167b is arranged below the hydrogen inlet hole Hin, and a connecting point between the connecting pipe 167 and the hydrogen circulation pump 64 in the gravity direction. However, the liquid retention part 167b shown in FIG. 3 is configured as a depressed part that is depressed downwardly inside the connecting pipe 167. With liquid retention part 167b, it is also possible to retain liquid water discharged from the hydrogen inlet hole Hin. Further, in the second embodiment, the connecting pipe 167 is common to the connecting pipe 67 shown in FIG. 2 in that the connecting pipe 167 is structured to descend monotonously from the hydrogen outlet hole Hout through the liquid retention part 167b without ascending. Also, in the second embodiment, it is preferred that the connecting pipe 167 is configured so that a flow passage sectional area of the liquid retention part 167b is smaller than a flow passage sectional area of each of portions of the connecting pipe 167 sandwiching the liquid retention part 167b.

As described so far, in the second embodiment, since the hydrogen off-gas pipe 161 serving as the hydrogen pipe has the liquid retention part 161b, liquid water discharged from the hydrogen outlet hole Hout is restrained from entering the gas-liquid separator 62 and freezing inside the gas-liquid separator 62. Similarly, since the connecting pipe 167 that serves as another hydrogen pipe has the liquid retention part 167b, liquid water discharged from the hydrogen inlet hole Hin is restrained from entering the hydrogen circulation pump 64 serving as the hydrogen-related auxiliary machine, and freezing inside the hydrogen circulation pump 64.

The disclosure is not limited to the foregoing embodiments and modifications, and is carried out in various configurations without departing from the gist of the disclosure. For example, technical features described in the embodiments and modifications corresponding to technical features in each aspect described in the summary may be replaced or combined as appropriate in order to solve a part or all of the problems described above, or to achieve a part or all of the effects described above. Also, the technical features that are not described as essential in this specification may be deleted as appropriate.

What is claimed is:

1. A fuel cell system, comprising:
a fuel cell stack having a hydrogen hole in which hydrogen gas passes;
a power converter arranged on top of the fuel cell stack;
a hydrogen-related auxiliary machine; and
a hydrogen pipe that connects the hydrogen hole and the hydrogen-related auxiliary machine,
wherein the hydrogen pipe includes a liquid retention part that is located below the hydrogen hole and a connecting point between the hydrogen pipe and the hydrogen-related auxiliary machine in a gravity direction,
the hydrogen hole includes a hydrogen outlet hole that is an outlet of hydrogen off-gas from the fuel cell stack, and a hydrogen inlet hole that is an inlet of hydrogen gas into the fuel cell stack,
the hydrogen-related auxiliary machine includes a gas-liquid separator configured to separate moisture from the hydrogen off-gas, and a hydrogen circulation pump configured to feed the hydrogen off-gas to the hydrogen inlet hole,
the hydrogen pipe includes a first hydrogen pipe that connects the hydrogen outlet hole and the gas-liquid separator, and a second hydrogen pipe that connects the hydrogen inlet hole and the hydrogen circulation pump,
the hydrogen circulation pump is arranged above the gas-liquid separator, and
the hydrogen circulation pump is arranged so that at least a part of a projected area of the hydrogen circulation pump overlaps the power converter when the hydrogen circulation pump is projected towards the power converter along a horizontal direction.

2. The fuel cell system according to claim 1, wherein the hydrogen hole is located below the connecting point between the hydrogen pipe and the hydrogen-related auxiliary machine.

3. The fuel cell system according to claim 1, wherein the hydrogen pipe is structured to descend from the hydrogen hole through the liquid retention part without ascending.

4. The fuel cell system according to claim 1, wherein the liquid retention part is a bent part that is bent to protrude downwardly.

5. The fuel cell system according to claim 1, wherein the liquid retention part is a depressed part that is depressed downwardly inside the hydrogen pipe.

* * * * *